United States Patent Office 2,952,725
Patented Sept. 13, 1960

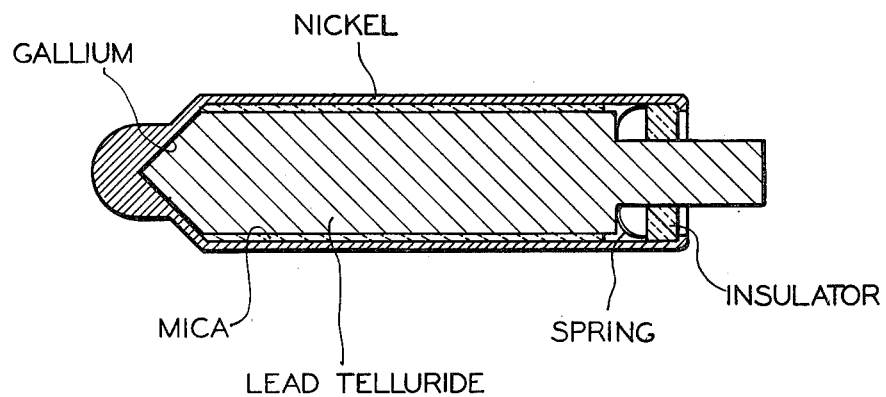

2,952,725

THERMOCOUPLE

Richard C. Evans, Hamden, and William C. Ready, Ansonia, Conn., assignors to Olin Mathieson Chemical Corporation, a corporation of Virginia Filed June 27, 1958, Ser. No. 744,902

1 Claim. (Cl. 136—4)

The present invention relates to thermocouples and in particular to thermocouples of the general class wherein the elements or electrodes thereof are held in areal contact at the hot junction by pressure.

A further characteristic of the class of thermocouples to which the invention relates is that at least one element of the couple is formed of a semi-conductor material such as lead telluride, lead selenide and the like.

A typical pressure contact thermocouple, hereinafter referred to as a contact thermocouple, with which the present invention is related is shown and described in U.S. Patent 2,811,569, issued October 29, 1957, to Fredrick et al.

A perennial problem in this class of thermocouples and one which is under constant attack by scientists is the search for means for effecting a reduction of contact resistance at the mating faces or interfaces of the pressurized thermocouple elements at the hot or cold junctions.

Frequently these contacting surfaces are ground and highly polished so as to effect the most complete areal contact possible while developing a minimum of resistance to electrical current flowing across the junction of the contacting faces.

It is a special feature of the present invention to provide a thermocouple of the above-described general group wherein the contact resistance has been reduced substantially and to an unexpected low level.

It is a further object of the invention to provide a contact thermocouple wherein the inner faces or the cross sectional area of the thermocouple elements at the point of contact is protected and provided with a seal against deterioration.

A further object of the invention is the provision of a contact thermocouple effective to withstand temperatures of the order of 30° C. to 1000° C. with accompanying resistance to oxidation.

A still further object of the invention is the provision of a contact thermocouple wherein at least one element of the couple is fabricated of a semi-conductor material and the interface or contacting surface of at least one couple is coated with gallium.

A still further feature of the invention is the provision of a contact thermocouple where a layer of gallium is disposed between the contacting surfaces of the thermocouple elements.

A thermocouple embracing certain features of the present invention may include at least two electrical conductors having contact electrodes, said electrodes having corresponding flat surfaces adapted to engage one another to make areal contact, means for maintaining a given unit pressure between the electrodes in the region of the areal contact, at least one electrode having a coating of gallium upon its contacting surface effective to reduce electrical resistance at the point of contact.

Other features and advantages of the invention will become more apparent to those skilled in the art to which the invention relates from an examination of the succeeding specification.

The application of gallium, usually in liquid form, to the interfaces of the point of contact of the electrodes of a thermocouple has effectively reduced the contact resistance particularly in situations where at least one electrode was fabricated of a semi-conductor material.

The single figure of the drawing is a sectional view of one embodiment of the invention.

The effectiveness of the reduction in contact resistance is indicated by the following table:

*Example 1*

| Thermocouple structure: | Contact resistance (in ohms) |
|---|---|
| Lead telluride rod ¼″ diameter having a ground surface in contact with a corresponding electrode formed of nickel and ground with the same finish and both electrodes maintained under a contact pressure of approximately 15 p.s.i. | .3 to 4.0 |
| Same structure as above with the gallium at the junction of the electrodes | .01 to .03 |

*Example 2*

| | |
|---|---|
| This thermocouple was fashioned in the same general manner and maintained under substantially the same contact pressure as in Example 1 except that the electrodes were fabricated of cuprous sulfide and iron respectively | 2.7 |
| Same structure as above with gallium at the junction of the electrodes | .6 |

The presence of gallium at the junction of the above thermocouples did not affect the voltage output of the couple hence by the present invention the power output is increased by a factor inversely proportional to the resistance.

It is well known that in thermocouples of the contact pressure type particularly those wherein one element is of a semi-conductor material, the initial resistance of the couple is exceedingly high. The thermocouple invariably arrives at an equilibrium resistance wherein the value of resistance drops slowly over a relatively short period. For example, it has been observed that a thermocouple of a given contact area and comprising iron and fused cuprous sulfide developed an immediate initial resistance of the order of 30 to 70 ohms. Thereafter and during an interval of approximately 5 minutes the contact resistance dropped to approximately 5 ohms without any change in contact area or contact pressure.

When gallium was sandwiched between the contact surfaces of this thermocouple, the initial resistance dropped within seconds from a level of 30 to 70 ohms to a value of the order of .6 to 2.7 ohms without any change in contact area or contact pressure.

It is to be particularly noted that although the above paragraph appears to contradict the data set forth in Example 2, attention is directed to the well-known fact that in contact thermocouples wherein at least one element is fabricated of a semi-conductor material the variation in resistance from point to point or area to area in a given quantity of semi-conductor material precludes uniformity of resistance values in comparing one thermocouple of the same general structure to another where they are made from different batches of the same material.

In fact, it sometimes happens that the electrical resistance of one cross sectional area of a given semiconductor varies widely from the corresponding resistance taken over a corresponding but adjacent area within the same piece of semi-conductor material even when the semi-conductor has been refined in accordance with the highest standards of purity.

Although the present invention has been described with respect to certain specific semi-conductor materials, it is anticipated that a variety of thermocouple structures may be devised where one or both of the electrodes are fabricated of semi-conductor material and having gallium disposed between the contacting surfaces of the electrodes without departing from the spirit and scope of the present invention.

What is claimed is:

A thermocouple having electrode elements held in areal contact and under a contact pressure of about 15 p.s.i. comprising an element formed of nickel, an element formed of lead telluride and a skin of gallium sandwiched between the elements at the point of contact, the contact resistance of said thermocouple being of the order of .01 to .03 ohm.

References Cited in the file of this patent

UNITED STATES PATENTS

| 2,732,464 | Ohl | Jan. 24, 1956 |
| 2,858,350 | Fritts et al. | Oct. 28, 1958 |

FOREIGN PATENTS

| 19,794 | Great Britain | Sept. 4, 1907 |